United States Patent
Ries et al.

(10) Patent No.: US 6,451,395 B1
(45) Date of Patent: Sep. 17, 2002

(54) MULTILAYER COMPOSITE HAVING A BARRIER ACTION

(75) Inventors: Hans Ries; Hans-Peter Hauck, both of Marl; Guido Schmitz, Duelmen, all of (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 09/379,789

(22) Filed: Aug. 24, 1999

(30) Foreign Application Priority Data

Aug. 26, 1998 (DE) .......................... 198 38 709

(51) Int. Cl.$^7$ .................. B32B 27/08; B32B 27/34; B32B 27/36; B32B 27/40; F16L 9/14

(52) U.S. Cl. ............... 428/36.8; 138/137; 138/DIG. 7; 180/313; 428/36.91; 428/423.3; 428/423.5; 428/475.2

(58) Field of Search ................... 138/137, 138, 138/DIG. 7; 428/36.8, 423.3, 423.5, 475.2, 36.91; 180/313

(56) References Cited

U.S. PATENT DOCUMENTS

| | | | | |
|---|---|---|---|---|
| 4,907,625 A | * | 3/1990 | Ito et al. ..................... | 138/126 |
| 5,313,987 A | * | 5/1994 | Rober et al. ................ | 138/137 |
| 5,362,529 A | * | 11/1994 | Mugge et al. .............. | 428/35.7 |
| 5,449,024 A | * | 9/1995 | Rober et al. ................ | 138/137 |
| 5,474,822 A | * | 12/1995 | Rober et al. .............. | 428/36.91 |
| 5,932,353 A | * | 8/1999 | Huarng et al. ................ | 8/423.5 |
| 6,090,459 A | * | 7/2000 | Jadamus et al. ........... | 428/36.4 |

FOREIGN PATENT DOCUMENTS

| | | | |
|---|---|---|---|
| EP | 0 569 681 A1 | * | 3/1993 |
| EP | 0 569 683 A1 | * | 3/1993 |
| EP | 0 601 295 A1 | * | 10/1993 |
| EP | 0 650 004 A1 | * | 1/1994 |
| EP | 0 637 509 A1 | * | 8/1994 |

* cited by examiner

*Primary Examiner*—Sandra M. Nolan
(74) *Attorney, Agent, or Firm*—Oblon, Spivak, McClelland, Maier & Neustadt, P.C.

(57) ABSTRACT

A multilayer composite comprising at least the following layers:

I. a layer I of a polyamide molding composition and
II. a layer II of a polyester molding composition, where the layers are firmly bonded to each other without use of an additional layer of bonding agent, wherein the polyester molding composition comprises a mixture of:
  a) from 80–99% by weight of a polyalkylene 2,6-naphthalate selected from the group consisting of polyethylene 2,6-naphthalate and polybutylene 2,6-naphthalate, and
  b) from 1–20% by weight of one or more compounds containing at least two isocyanate groups, wherein, in addition, the isocyanate groups from component IIb are present in layer II in a concentration of from 0.03–3% by weight.

16 Claims, No Drawings

MULTILAYER COMPOSITE HAVING A BARRIER ACTION

BACKGROUND OF THE INVENTION

1. Field of the Invention

The present invention relates to a multilayer plastic composite having a barrier action, for example, in a pipe, in a hollow body or as a film.

2. Description of the Background

Plastic pipes made of polyamide are known and have been used in a variety of applications. In order to fulfill their task, the pipes have to be, inter alia, inert toward the medium flowing in them and resistant to high and low temperatures and to mechanical stresses.

Single-layer pipes are not always able to meet the necessary requirements. In the transport of, for example, aliphatic or aromatic solvents, fuels or the like, such pipes display considerable disadvantages such as unsatisfactory barrier action against the medium, undesired dimensional changes or unacceptably low mechanical stressability.

Attempts have been made to overcome these disadvantages by means of multilayer pipes which include a barrier layer. Well-suited barrier layer materials are, for example, polyethylene naphthalate and polybutylene naphthalate. However, the adhesion between the layers in multilayer pipes is basically problematical, because of the incompatibility of most plastics. A strong bond between the individual polymer layers is, however, absolutely necessary for industrial applications.

EP 0 637 509 and DE 42 14 383 describe multilayer pipes which have a barrier action and comprise a barrier layer of polyethylene naphthalate or polybutylene naphthalate which is joined to a polyamide layer by means of a bonding agent. However, the bonding agent presents problems in both cases. In the composites described in DE 42 14 383, the bonding agent comprising thermoplastic polyurethane is susceptible to methanol-containing fuels, so that the adhesion between the layers is lost after prolonged contact; in addition, the viscosity of the commercial thermoplastic polyurethanes is so low at the temperatures required for coextrusion with a polyalkylene naphthalate that satisfactory coextrusion presents extreme difficulties because of the high viscosity differences. Furthermore, the danger of thermal decomposition is relatively high even at low residence times. The bonding agents which are disclosed in EP 0 637 509 become embrittled on prolonged contact with methanol-containing fuels at elevated temperature, while the adhesion between the layers is likewise lost.

Essentially, composites which require additional layers of bonding agent in addition to the purely functional layers have the disadvantage that the number of layers to be extruded increases as a result of the use of a bonding agent, which leads to increased costs for procurement and operation of the extrusion plant. To this must be added the costs for quality assurance of the multilayer composite which likewise increase with increasing number of layers.

An improvement can in principle be achieved here by means of self-adhesive barrier layers. Thus, EP 0 569 681, EP 0 569 683 and EP 0 601 295 describe multilayer composites having a barrier layer which constitutes a mixture of a partially crystalline polyester such as polybutylene terephthalate and compounds which contain at least two isocyanate groups.

However, the bonding agent-free composites disclosed therein have the disadvantage that the adhesion between polyamide and polyester barrier layer is lost after prolonged contact with methanol-containing fuels at high temperature, e.g. test using test fuel CM15 at 60° C. (in accordance with Ford WSS-M98D33-A). The same result is also found when such pipes are used as cooling fluid lines. A need, therefore, continues to exist for pipes and similar such devices which possess a barrier layer of improved adhesion and barrier action against various fluid media.

SUMMARY OF THE INVENTION

Accordingly, one object of the present invention is to provide a multilayer composite having a good barrier action against the medium in contact therewith, e.g. fuels, in particular methanol-containing fuels, their individual components, fuel vapors, oils and also against cooling fluids, as well as their individual components, usually glycol and water, which multilayer composite contains no additional layers of bonding agent and whose individual layers nevertheless form a strong composite in which the adhesion between the layers is maintained even after long storage exposure to methanol-containing fuels at elevated temperature or after prolonged action of cooling fluid under operating conditions.

Briefly, this object and other objects of the present invention as hereinafter will become more readily apparent can be attained by a multilayer composite comprising at least the following layers:

I. a layer I of a polyamide molding composition, and
II. a layer II of a polyalkylene 2,6-naphthalate molding composition which comprises a mixture of:
 a) from 80–99% by weight of polyalkylene 2,6-naphthalate and
 b) from 1–20% by weight of one or more compounds containing at least two isocyanate groups, wherein the polyalkylene 2,6-naphthalate is a polyethylene 2,6-naphthalate or a polybutylene 2,6-naphthalate and, furthermore, the isocyanate groups from component IIb are present in layer II in a concentration of from 0.03–3% by weight, whereby the layers are firmly bonded to one another without use of an additional layer of bonding agent.

DETAILED DESCRIPTION OF THE PREFERRED EMBODIMENTS

Suitable polyamides first and foremost include aliphatic homopolycondensates and copolycondensates. Examples which may be mentioned include 4.6-, 6.6-, 6.12-, 8.10-, 10.10-polyamides and the like. Preference is given to 6-, 10.12-, 11-, 12- and 12.12-polyamides. [The designation of the polyamides corresponds to the international standard, where the first digit(s) indicate(s) the number of carbon atoms in the starting diamine and the last digit(s) indicate(s) the number of carbon atoms in the dicarboxylic acid. If only one figure is given, this means that an $\alpha,\omega$-aminocarboxylic acid or the lactam derived therefrom has been used as starting material—H. Domininghaus, Die Kunststoffe und ihre Eigenschaften, page 272, VDI-Verlag (1976).]

If copolyamides are used, they are comprised of for example, adipic acid, sebacic acid, suberic acid, isophthalic acid or terephthalic acid as coacid and bis(4-aminocyclohexyl)methane, trimethylhexamethylenediamine, hexamethylenediamine or the like as the codiamine.

The preparation of these polyamides is known as described by, e.g., D. B. Jacobs, J. Zimmermann, Polymerization Processes, pp. 424–67; Interscience Publishers, New York (1977) and in DE 21 52 194.

Other suitable polyamides include mixed aliphatic/aromatic polycondensates, which are described, for example, in U.S. Pat. Nos. 2,071,250; 2,071,251; 2,130,523; 2,130,948; 2,241.322; 2,312,966; 2,512,606; 3,393,210 or in Kirk-Othmer, Encyclopedia of Chemical Technology, 3rd edition, Vol. 18, pages 328 and 435, Wiley & Sons (1982). Other polycondensates which are likewise suitable as polyamides include poly(ether esteramides) and poly(etheramides). Such products are described, for example, in DE 27 12 987, DE 25 23 991 and DE 30 06 961.

The molecular weight (number average) of the polyamides is above 5000, preferably above 10,000, which values correspond to a relative viscosity ($\eta_{rel}$) in the range from 1.5–2.8.

In a preferred embodiment, the polyamides employed in layer I include those in which at least 30% of all terminal groups are amino groups.

The polyamides mentioned are used alone or in mixtures.

If required, the polyamides and/or the polyalkylene 2,6-naphthalate can be impact-modified. Polymers suitable for this purpose include, for example, ethylene-propylene and ethylene-propylene-diene copolymers (EP 0 295 076), polypentenylene, polyoctenylene and random and block copolymers of alkenylaromatic compounds with aliphatic olefins and dienes (EP 0 261 748). Impact modifiers also include impact-modifying rubbers such as core/shell rubbers having a tough and resilient core of (meth)acrylate, butadiene or styrene-butadiene rubber having a glass transition temperature $T_g$ of $<-10°$ C., the cores of which can be crosslinked The shell can be made-up of styrene and/or methyl methacrylate and/or other unsaturated monomers (DE 21 44 528 and DE 37 28 685). The proportion of impact-modifying components needs to be selected such that the desired properties are not impaired.

Layer II preferably comprises a mixture of from 85–99% by weight, preferably from 90–98% by weight, of polyalkylene 2,6-naphthalate and from 1–15% by weight, preferably from 2–10% by weight, of one or more compounds containing at least two isocyanate groups. In a particularly preferred embodiment, layer II comprises a mixture of a) from 99–95% by weight of polyalkylene 2,6-naphthalate and b) from 1–5% by weight of a mixture of:
  1) from 30–70% by weight of at least one compound containing two isocyanate groups and
  2) from 30–70% by weight of at least one compound containing more than two isocyanate groups, where the isocyanate groups are present in layer II in a concentration of from 0.03–0.3% by weight.

Preferably, component a) is present in an amount of from 98–96% by weight and component b) is present in an amount of from 2–4% by weight.

Component b) preferably comprises a mixture of from 40–60% by weight of at least one compound containing two isocyanate groups and from 40–60% by weight of at least one compound containing more than two isocyanate groups.

The isocyanate groups are preferably present in layer II in a concentration of from 0.06–0.25% by weight.

Suitable compounds containing two isocyanate groups include, in particular, aromatic and (cyclo)aliphatic isocyanates such as phenylene 1,4-diisocyanate, tolylene 2,4-diisocyanate, tolylene 2,6-diisocyanate, naphthylene 1,5-diisocyanate, hexamethylene 1,6-diisocyanate, diphenylmethane 2,4'-diisocyanate, diphenylmethane 4,4'-diisocyanate, diphenylmethane 2,2'-diisocyanate, isophorone diisocyanate, tetramethylene 1,4-diisocyanate, dodecane 1,12-diisocyanate. Other examples include cyclohexane 1,3-diisocyanate, cyclohexane 1,4-diisocyanate, cyclobutane 1,3-diisocyanate, hexahydrotolylene 2,4-diisocyanate, hexahydrotolylene 2,6-diisocyanate, hexahydrophenylene 1,3-diisocyanate, norbornane diisocyanate, p- or m-xylylene diisocyanates, perhydrodiphenylmethane 2,4'-diisocyanate and perhydrodiphenylmethane-4,4'-diisocyanate.

In layer II, compounds containing two isocyanate groups, which have been found to be particularly advantageous, are isophorone diisocyanate and reaction products of this compound with itself and with suitable reactants such as $\alpha,\omega$-diols having 2–10 carbon atoms in the carbon chain. Preferred reaction products are obtained, for example, from the reaction of at least two molecules of isophorone diisocyanate, where the bond is formed by reaction of at least two isocyanate groups, to form a biuret group.

Other particularly preferred reaction products are prepared, for example, by reaction of at least two isophorone diisocyanate molecules with one molecule of diol, where in each case one isocyanate group of the isophorone diisocyanate forms a urethane bond with one of the hydroxyl groups of the diol. Examples of particularly suitable diols include butanediol and diethylene glycol.

Suitable compounds containing more than two isocyanate groups include compounds which preferably contain exactly three isocyanate groups. Compounds of this type include, for example, triphenylmethane-4,4',4"-triisocyanate and reaction products of the abovementioned diisocyanates, in particular triisocyanurates of these diisocyanates, for example the triisocyanurate which is formed from the reaction of at least three molecules of hexamethylene diisocyanate. Particularly preferred is the triisocyanurate which is formed by reaction of three molecules of isophorone diisocyanate.

The isocyanate groups can be present in blocked form. The blocking of isocyanate groups is known, e.g. Paint Resin 58 (1988) 5, 18–19. An example of such blocking is the reaction of the isocyanate groups with diols, pyrazoles, oximes, in particular ketoximes, and lactams, in particular caprolactam.

It is possible to add customary auxiliaries and additives such as flame retardants, stabilizers, plasticizers, processing aids, viscosity improvers, fillers, in particular fillers which improve conductivity, pigments or the like to the molding compositions of layers I and II. In particular, it is advantageous to make the layer which is in contact with a flammable medium electrically conductive by addition of carbon black, carbon fibers, graphite fibrils, metal fibers, metal powder or the like, so that the surface resistance is less than $10^9$ $\Omega$cm. The amount of the abovementioned agents added should be such that the desired properties are not seriously affected.

The molding composition for layer II can be produced by any customary and known method such as by mill-mixing of the components II.a) and II.b) in a mixer providing good kneading, e.g. a twin-screw kneader, at temperatures which depend on the melting points of the components II.a) and II.b), in general at temperatures from 200–300° C.

In the production of the molding composition for layer II, it is possible to use the known catalysts customary in the processing of isocyanates.

The molding composition for layer II should be stored under dry conditions with exclusion of atmospheric moisture before production of the multilayer pipes.

The above-described production of the molding composition for layer II can also be conducted directly in a feed extruder of the coextrusion unit or injection molding unit used for producing the multilayer composites, so that the molding composition for layer II can be processed immediately after being produced, without further intermediate storage, to form a layer of the multilayer composite. In the case of coextrusion, the processing conditions in the production of the multilayer composites must be selected such that the melts are superposed under a sufficiently high pressure.

Multilayer pipes are manufactured in a known manner by coextrusion.

The multilayer composites of the invention have very good resistance to and also very good barrier action against diffusion of (petro)chemical materials, solvents and fuels. Furthermore, the two layers remain durably and firmly bonded to one another even at relatively high operating temperatures, so that shearing of the various layers from one another does not occur, for example, on thermal expansion or bending of a pipe. In addition, it is also possible to produce, apart from a two-layer composite, other types of composite which consist, for example, of three or more layers by additionally incorporating additional layers I or II therein In a preferred embodiment, the multilayer composites have a three-layer structure: layer I/layer II/layer I.

In addition, it is also possible for other layers to be present, e.g. a rubber layer adjacent to layer I on the outside of a pipe.

In a three-layer pipe having an external diameter of 8 mm and a total wall thickness of 1 mm, the thicknesses of the layers from the inside to the outside can be, for example, 0.2 mm, 0.2 mm, and 0,6 mm. According to the invention, other layer thickness distributions are also conceivable, for example with a thicker middle layer of, for example, 0.4 mm.

The multilayer composites of the invention are preferably used for the transport of (petro)chemical materials, for example, for filling station supply lines, or in the motor vehicle sector for conveying brake, cooling and hydraulic fluids and also fuel. A further use is the production of hollow bodies such as fuel containers or filling ports, in particular for the motor vehicle sector. The pipes can be used here in straight or in corrugated form. They are particularly advantageously only corrugated in the region of a bend.

A further application of the multilayer composites of the invention is in the preparation of films, for example packaging films, in which low gas permeability is required.

Having generally described this invention, a further understanding can be obtained by reference to certain specific examples which are provided herein for purposes of illustration only and are not intended to be limiting unless otherwise specified.

The results presented in the following examples were determined by means of the following measurement methods.

The determination of the solution viscosity (relative viscosity $\eta_{rel}$) of the polyamides was conducted at 25° C. in accordance with DIN 53 727/ISO 307 using a 0.5% strength by weight m-cresol solution.

To determine the amino end groups, 1 g of the polyamide was dissolved in 50 ml of m-cresol at 25° C. The solution was titrated potentiometrically with perchloric acid. In order to determine the carboxyl end group content in the polyamide, 1 g of polycondensate was dissolved in 50 ml of benzyl alcohol at 165° C. under a blanket of nitrogen. The solution time was at most 20 minutes. The solution was titrated against phenolphthalein with a solution of KOH in ethylene glycol (0.05 mol of KOH/l) to the color change.

The determination of the solution viscosity (viscosity number J) of the polyesters was conducted in a 0.5% strength by weight phenol/o-dichlorobenzene solution (weight ratio=1:1) at 25° C. in accordance with DIN 53 728/ISO 1628/5-Part 5.

For the determination of the isocyanate groups, 6 g of the component II. (polyester, isocyanate) were dissolved at 180° C. in a mixture of dichlorobenzene/dibutylamine (volume ratio=80:20). The solution was titrated at 20° C. with 10% strength hydrochloric acid against bromo-phenol as indicator (DIN 53 185).

The adhesion of two layers to one another was tested by means of an adhesion test based on ISO 8033 (Dec. 1, 1991).

The determination of the diffusion of fuel components was conducted on pipes using a fuel mixture (fuel CM15:42.5 parts by volume of isooctane, 42.5 parts by volume of toluene and 15 parts by volume of methanol) at 23° C. and 50% atmospheric humidity. The specimens having a length of 200 mm were filled with the fuel mixture and were connected to a filled reservoir during the measurement. The diffusion was determined as weight loss by diffusion over time (measured every 24 hours). The measure reported was the weight loss recorded per unit area when the diffusion process is in equilibrium, i.e. when the weight loss determined per 24 hours no longer changes with time.

Examples denoted by letters are not according to the invention.

EXAMPLE

Polyamides used for layer I:
  PA 1: Polyamide 12 ($\eta_{rel}$: 2.08; 30% of the end groups are amino groups)
  PA 2: Polyamide 12 ($\eta_{rel}$: 2.05; 86% of the end groups are amino groups)
Polyester molding compositions used for layer II:
  Z 1: Homopolybutylene 2.6-naphthalate (J value: 140 cm$^3$/g; TEIJIN Ltd., Japan)
  Z 2: Mixture of 95% by weight of homopolybutylene terephthalate (J value: 15 cm$^3$/g, VESTODUR 1000, Creanova Spezialchemie GmbH, D-45764 Marl, Germany) and 5% by weight of a mixture consisting of:
    a. 50% by weight of a uretdione which is built up from two molecules of isophorone diisocyanate and in which the remaining NCO groups are blocked with caprolactam, and
    b. 50% by weight of isocyanurate of isophorone diisocyanate (VESTANAT® T1890, Creanova Spezialchemie GmbH, D-45764 Marl, Germany).
  Z 3: Mixture of 95% by weight of Z 1 and 5% by weight of the same mixture as in Z 2.

Three-layer pipes having an external diameter of 8 mm and a wall thickness of 1 mm were produced from the abovementioned molding composition. The thicknesses of the three individual layers were 0.4/0.2/0.4 mm. The pipes were produced on a laboratory extrusion unit using a 5-layer tube die, with two channels of the die being closed. The melt temperatures during processing were 230° C. for the polyamides PA 1 and PA 2, 250° C. for the molding composition Z 2 and 270° C. for the molding compositions Z 1 and Z3.

The pipes were exposed on the inside to methanol-containing fuel CM15 at 60° C. for 1000 hours in a test apparatus in accordance with SAE J 1737. The permeation rate was determined in accordance with SAE J 1737. Subsequently, the pipes which had been preconditioned in this way were taken out and dried at 60° C. for 24 hours in a vacuum drying oven. Specimens in accordance with ISO 8033, type 4, were then produced from the pipes and the adhesion both between outer and intermediate layer and between inner and intermediate layer was determined in each case.

| Experiment | Outer Layer | Intermediate Layer | Inner Layer | Permeation rate [g/m² · day] | Separation force at the interface before fuel storage [N/cm] | | Separation force at the interface after fuel storage [N/cm] | |
|---|---|---|---|---|---|---|---|---|
| A | PA2 | Z1 | PA2 | not measured | no adhesion | no adhesion | no adhesion | no adhesion |
| B | PA1 | Z2 | PA1 | 110 | 25 | 23 | no adhesion | no adhesion |
| C | PA2 | Z2 | PA2 | 115 | 45 | 47 | 5 | no adhesion |
| 1 | PA1 | Z3 | PA1 | 10 | 27 | 32 | 20 | 15 |
| 2 | PA2 | Z3 | PA2 | 9 | 42 | 41 | 35 | 32 |

What is claimed as new and is desired to be secured by Letters Patent:

1. A multilayer composite comprising at least the following layers:
   I. a layer I of a polyamide molding composition and
   II. a layer II of a polyester molding composition, where the layers are firmly bonded to each other without use of an additional layer of bonding agent, wherein the polyester molding composition comprises a mixture of:
      a) from 80–99% by weight of a polyalkylene 2,6-naphthalate selected from the group consisting of polyethylene 2,6-naphthalate and polybutylene 2,6-naphthalate, and
      b) from 1–20% by weight of one or more compounds containing at least two isocyanate groups, wherein, in addition, the isocyanate groups from component II.b are present in layer II in a concentration of from 0.03–3% by weight.

2. The multilayer composite as claimed in claim 1, wherein at least 30% of all terminal groups of the polyamide of layer I are amino groups.

3. The multilayer composite as claimed in claim 1, wherein layer II comprises a mixture of:
   a) from 99–95% by weight of polyalkylene 2,6-naphthalate and
   b) from 1–5% by weight of a mixture of:
      1) from 30–70% by weight of at least one compound containing two isocyanate groups, and
      2) from 30–70% by weight of at least one compound containing more than two isocyanate groups, wherein the isocyanate groups are present in layer II in a concentration of from 0.03–0.3% by weight.

4. The multilayer composite as claimed in claim 3, wherein the compound containing two isocyanate groups is phenylene 1,4-diisocyanate, tolylene 2,4-diisocyanate, tolylene 2,6-diisocyanate, naphthylene 1,5-diisocyanate, hexamethylene 1,6-diisocyanate, diphenylmethane 2,4'-diisocyanate, diphenylmethane 4,4'-diisocyanate, diphenylmethane 2,2'-diisocyanate, isophorone diisocyanate, tetramethylene 1,4-diisocyanate, dodecane 1,12-diisocyanate, cyclohexane 1,3-diisocyanate, cyclohexane 1,4-diisocyanate, cyclobutane 1,3-diisocyanate, hexahydrotolylene 2,4-diisocyanate, hexahydrotolylene 2,6-diisocyanate, hexahydrophenylene 1,3-diisocyanate, norbornane diisocyanate, p- or m-xylylene diisocyanates, perhydrodiphenylmethane 2,4'-diisocyanate or perhydrodiphenylmethane-4,4'-diisocyanate.

5. The multilayer composite as claimed in claim 3, wherein the amount of each of the compound containing two isocyanate groups and the compound containing more than two isocyanate groups ranges from 40–60 wt%.

6. The multilayer composite as claimed in claim 1, wherein the compound containing two isocyanate groups, which is used in layer II, is isophorone diisocyanate or a compound derived therefrom by reaction with itself or with α,ω-diols having 2–10 carbon atoms.

7. The multilayer composite as claimed in claim 3, wherein the compound containing more than two isocyanate groups is a triisocyanurate derived from isophorone diisocyanate.

8. The multilayer composite as claimed in claim 4, wherein the compound containing more than two isocyanate groups is a triisocyanurate derived from isophorone diisocyanate.

9. The multilayer composite as claimed in claim 1, wherein layer II comprises an isocyanate blocked by a lactam.

10. The multilayer composite as claimed in claim 1, comprising the layer sequence I/II/I.

11. The multilayer composite as claimed in claim 1, wherein one layer is made electrically conductive and has a surface resistance of less than $10^9$ Ωcm.

12. The multilayer composite as claimed in claim 1, which further comprises a rubber layer adjacent to layer I.

13. The multilayer composite as claimed in claim 1, which is a pipe or a hollow body.

14. A method of transporting (petro)chemical materials, comprising: transporting said (petro)chemical materials through the multilayer composite of claim 1.

15. A method of manufacturing motor vehicles, comprising:
   assembling motor vehicles in which the brake fluid lines, cooling fluid lines, hydraulic fluid lines and/or fuel lines are prepared from the multilayer composite of claim 1.

16. A method, comprising:
   manufacturing a fuel container or filling port from the multilayer composite as claimed in claim 1.

* * * * *